Patented Aug. 4, 1931

1,816,922

UNITED STATES PATENT OFFICE

PARKE H. WATKINS, OF NAUGATUCK, CONNECTICUT, ASSIGNOR TO THE NAUGATUCK CHEMICAL COMPANY, OF NAUGATUCK, CONNECTICUT, A CORPORATION OF CONNECTICUT

PROCESS OF COATING CONCRETE WITH RUBBER AND PRODUCT

No Drawing. Application filed September 19, 1928. Serial No. 307,063.

This invention relates to the novel method of coating concrete with rubber and the article thereby produced.

Heretofore it has been common practice in coating various materials such as iron, wood and concrete with rubber, to apply coats of rubber cement usually of hard rubber cement followed by an intermediate rubber cement which after having been dried, serves as a bond between the surface being coated and a sheet of rubber applied thereover. This method of coating articles has the objection that it requires much skilled labor, thereby making the process an expensive one and that the bond between the sheet of rubber and the material being coated is not sufficiently strong to prevent frequent separation of the rubber coating and the surface to which it is applied.

It is the object of my invention to provide a novel method of applying rubber to surfaces, especially concrete surfaces, which will provide a more secure union between the surface being coated and the rubber. Another object of my invention is to provide a new type of rubber coating which is more easily applied, requiring less skilled labor than the methods heretofore employed, and which provides for a more permanent coating of rubber.

Without intending to impose limitations more than required by the prior art, my invention, broadly stated, consists in successively treating the concrete surface with iron and copper sulphate, the thus treated surface being then coated with rubber which may be accomplished by first applying one or more coats of rubber cement followed by a usual sheet of rubber or by a coating of rubber laid down from a water dispersion of rubber.

In carrying out my invention one of the preferred methods consists in applying by brushing or otherwise, a thick paste of powdered iron and water to the surface of the concrete which surface preferably has been previously wetted in order to facilitate the application of the paste. This paste is dried at ordinary or elevated temperatures and a coat of copper sulphate solution is applied thereover by brushing spraying, dipping or otherwise, which excess copper sulphate solution is rinsed off and the surface allowed to dry. Over the dried surface there is applied by brushing, spraying, dipping or any other suitable manner, a coat of rubber cement of the following composition:

| | | |
|---|---|---|
| Smoked sheet rubber | 50 | parts by weight |
| Spray dried latex | 50 | " |
| Zinc oxide | 75 | " |
| Lime | 10 | " |
| Magnesium oxide | 75 | " |
| Tetramethylthiuramdisulphide (accelerator) | 10 | " |
| Dibenzylamine | 10 | " |
| Sulphur | 60 | " |
| Aluminum powder | 25 | " |
| Phthalic anhydride | .25 | " |
| Acetaldehyde condensation product (antioxidant) | 3 | " |
| Carbon bisulphide | 10 | c. c. per gallon |

Two pounds of the above compound thoroughly mixed and broken down on the mill are mixed with one gallon of solvent naphtha or any other suitable solvent such as gasoline or carbon tetrachloride.

As many coats of the above cement may be applied as desired, three coats being a satisfactory number, each coat being dried after its application.

The surface of the concrete coated as above set forth is then coated with a water dispersion of rubber and compounding ingredients, a preferred formula for which is

| | | |
|---|---|---|
| Rubber (as latex twice creamed with pectin, semicured and diluted to 35% solids) | 100 | parts by weight |
| Zinc oxide | 2 | " " " |
| Carbon black | 3 | " " " |
| Sulphur | 7.5 | " " " |
| Ammonium thiocyanate | .1 | " " " |
| Nekal | 1 | |
| Sodium polysulphide | 0.4 cc. per 100 cc. of mixture | |

The solids of the above formula are added to the latex and a sufficient amount of water added to reduce the concentration to approximately 35% total solids. In the above formula the Nekal is a condensation product of an aromatic hydrocarbon with an aliphatic alcohol in the presence of sulphuric acid and acts as a preservative of latex to prevent premature coagulation and also serves to increase the penetrating power of the latex.

The water dispersion of rubber and compounding ingredients may be applied in any suitable manner such as by dipping the object therein or by spraying the dispersion on the surface of the article. The film of dispersion formed on the concrete over the previously applied coat of rubber in the manner above described, is coagulated by dipping the object in a coagulating medium such as a 50% solution of acetic acid and alcohol or by spraying the surface with such a solution or by subjecting the film to the action of any other coagulating agent such as heat or by any coagulating vapor. This coagulation causes the deposition of solid constituents of the water dispersion on the previously treated surface of the article to form a thick coat of rubber, which due to the method of its application, is firmly adherent to the previous coat of rubber laid down from the rubber cement, thereby forming a firm bond between the concrete article and the final coat of rubber. It is to be noted that, due to the application of the rubber according to the above method, no skilled labor is required therefor, the operations being performed largely in mechanical fashion so that the process is more economical than those heretofore employed for coating articles with rubber. The layer of rubber laid down from the water dispersion by coagulation is cured at a temperature and pressure as determined by the vulcanizing ingredients incorporated in the water dispersion. When the particular formula for the water dispersion above set forth is employed, a satisfactory cure may be obtained by subjecting the rubber to a temperature corresponding to 40 pounds of steam pressure for 40 minutes.

While in carrying out the above process a preferred method of applying the final heavy coat of rubber is by depositing the rubber from a water dispersion of rubber or rubber and compounding ingredients, yet the final coat of rubber may be in the form of a calendered sheet applied in the usual manner over the coat of dried rubber cement. The reaction product of powdered iron and copper sulphate in the previous coats serves to give a better adherence between the concrete surface and the layers of rubber.

In applying the powdered iron to a concrete surface the iron enters the small pits in the surface and the copper sulphate applied thereover reacts therewith to form a thin deposit of copper and iron sulphate, the iron sulphate being rinsed off. Not all of the iron is acted upon by the copper sulphate, and in contact with the rinsing water the iron forms an oxide which occupies a greater volume than metallic iron thus thoroughly stopping up the pores of the surface. When the rubber cement is applied over the deposit of copper the copper and rubber react so as to reduce the viscosity of the cement and the cement thoroughly covers the surface and fills all microscopic crevices. On curing the rubber cement to hard rubber the action of the copper on the rubber is stopped and a permanent bond is secured between the rubber and the concrete surface.

While in the foregoing detailed description a preferred method and product have been described as an example of my invention, it is not intended to limit my invention thereto inasmuch as the constituents of the materials such as the cement and water dispersion of rubber may be varied within wide limits and the steps of applying the rubber to the treated concrete surface may be varied, for example the rubber cement may be laid down directly over copper sulphate without the use of powdered iron and then the water dispersion of rubber and compounding ingredients applied. For an understanding of the scope of my invention, reference should be made to the following claims.

Having thus described my invention, what I claim and desire to protect by Letters Patent is:

1. In a process of coating concrete with rubber, the steps of applying and drying an iron paste to the surface of the concrete, applying and drying a copper sulphate solution over the iron, applying a coat of rubber on the treated surface, and vulcanizing.

2. In a process of coating concrete with rubber, the steps of applying finely divided iron on the surface of the concrete, applying copper sulphate solution over the iron, applying a coat of compounded rubber on the treated surface, and vulcanizing.

3. In a process of coating concrete with rubber, the steps of applying iron paste to the surface of the concrete, applying copper sulphate solution over the iron, applying and drying rubber cement, applying a water dispersion of rubber, depositing solid constituents thereof, and vulcanizing.

4. In a process of coating concrete with rubber, the steps of applying and drying an iron paste to the surface of the concrete, applying and drying a copper sulphate solution over the iron, applying and drying rubber cement on the treated surface; applying a coating of compounded rubber latex over the dried rubber cement, coagulating the latex to deposit solid constituents thereof, and vulcanizing.

5. Concrete having a permanent coating of vulcanized rubber bonded thereto by the reaction product of iron and copper sulphate.

6. Concrete having a permanent coating of rubber, said rubber being hard vulcanized at least adjacent the cement and bonded to the cement by the reaction product of iron and copper sulphate.

7. Concrete having a permanent coating of rubber, said coating comprising integrally united vulcanized layers, the innermost of which is hard vulcanized and the outermost of which is composed of unmilled rubber, the coating being bonded to the cement by the reaction product of iron and copper sulphate.

Signed at Naugatuck, county of New Haven, State of Connecticut, this 15th day of September, 1928.

PARKE H. WATKINS.